United States Patent [19]
Stubbing

[11] Patent Number: 5,711,086
[45] Date of Patent: Jan. 27, 1998

[54] METHOD AND APPARATUS FOR CONTINUOUS DRYING IN SUPERHEATED STEAM

[75] Inventor: Thomas John Stubbing, Ludlow, Great Britain

[73] Assignee: Heat-Win Limited, Shropshire, United Kingdom

[21] Appl. No.: 602,718

[22] PCT Filed: Aug. 23, 1994

[86] PCT No.: PCT/GB94/01843

§ 371 Date: Feb. 21, 1996

§ 102(e) Date: Feb. 21, 1996

[87] PCT Pub. No.: WO95/06229

PCT Pub. Date: Mar. 2, 1995

[30] Foreign Application Priority Data

Aug. 26, 1993 [GB] United Kingdom ............. 9317727

[51] Int. Cl.[6] .................................. F26B 21/06
[52] U.S. Cl. ............................ 34/77; 34/86; 34/217; 34/449; 34/559
[58] Field of Search ............................ 34/77, 78, 86, 34/174, 175, 179, 213, 219, 449, 559

[56] References Cited

U.S. PATENT DOCUMENTS

| | | | |
|---|---|---|---|
| 1,513,161 | 10/1924 | Darrah | 432/49 |
| 1,566,275 | 12/1925 | Harrison | 432/133 |
| 1,761,472 | 6/1930 | Fox . | |
| 4,026,037 | 5/1977 | Buchholz | 34/77 |
| 4,121,350 | 10/1978 | Buchholz | 34/77 |
| 4,389,797 | 6/1983 | Spigarelli et al. | 34/73 |
| 4,612,712 | 9/1986 | Pescatore et al. | 34/68 |
| 5,105,558 | 4/1992 | Curry | 34/449 |

FOREIGN PATENT DOCUMENTS

| | | |
|---|---|---|
| 424893 | 12/1937 | Belgium . |
| 965960 | 6/1957 | Germany . |
| 26778 | of 1910 | United Kingdom . |
| 798291 | 7/1958 | United Kingdom . |
| 1126906 | 9/1968 | United Kingdom . |

OTHER PUBLICATIONS

"Stoving Techniques for Mass Production", *Mechanical World and Engineering Record*, vol. 134, Oct. 1954, p. 449.

Primary Examiner—Henry A. Bennett
Assistant Examiner—Dinnatia Doster
Attorney, Agent, or Firm—Young & Thompson

[57] ABSTRACT

Apparatus for continuous drying of moist materials in superheated steam comprises a drying enclosure 10, open-ended inlet and outlet ducts 11, 12 communicating with the enclosure, and conveyors 13, 14, 15 for conveying the material to be dried along the inlet duct, through the enclosure and along the outlet duct. Superheated steam is generated in the enclosure from the moisture in the material 19 being dried by circulating the initial gas within the enclosure between a heat source 23 and the material, and/or by the injection into the enclosure of superheated steam from an external source. The inlet duct 11 and outlet duct 12 both extend downwardly from the enclosure 10 and a vent duct 22 from the enclosure has an outlet 26 normally at a level midway along the two ducts. In use, superheated steam tending to pass downwardly along the ducts meets external air tending to pass upwardly along the ducts and forms within each duct a temperature and density differential stratification layer 21. These layers act as barriers to the escape of steam from the enclosure while at the same time permitting the free conveyance of material along the ducts and into and out of the enclosure 10.

14 Claims, 4 Drawing Sheets

METHOD AND APPARATUS FOR CONTINUOUS DRYING IN SUPERHEATED STEAM

FIELD OF THE INVENTION

The invention relates to a method and apparatus for continuous drying of moist materials in superheated steam.

BACKGROUND OF THE INVENTION

The expression "materials" is intended to include moist materials of all kinds which may require to be dried, including granular or friable raw materials, partly processed materials and products, finished materials and products, and residues. For example the invention is applicable to the drying of chemicals, pharmaceuticals, coal, timber, cloth, paper, towels, bed linen, garments, bricks, porcelain, sewage sludge and the residues produced by the recycling of paper.

It is known to dry moist materials by the use of superheated steam. For example, British Patent Specification No. 2209383 describes a method and apparatus in which moist materials to be dried are introduced into an enclosure and the air or other gas which initially fills the enclosure is recirculated between a heat source and the material so as to produce steam from the moisture in the material. This steam increasingly displaces the initial gas from the enclosure and continues to be heated by recirculation past the heat source until it becomes superheated. A proportion of the steam is discharged from the enclosure through a vent and at least part of the thermal energy is recovered from the discharged steam by condensation.

Specification No. 2209383 discloses primarily a batch process in which a batch of material is introduced into the enclosure, is dried and is then removed. However for many commercial applications it is desirable for materials to be dried in a continuous process where the materials are continually passed through a drying location. In a batch method there is no difficulty in retaining the superheated steam in the enclosure while drying is taking place since the enclosure may simply be sealed in gas-tight manner after the batch of material has been introduced and opened again when it is necessary to remove the material after drying. In a continuous drying process, however, it is necessary to prevent the escape of the superheated steam from the enclosure, and the entry of air into the enclosure, during drying, while at the same time allowing the continual passage of materials into and out of the enclosure. It is therefore necessary to provide some sort of substantially gas-tight seal or barrier which will permit the passage of the materials into and out of the enclosure while at the same time preventing the escape of the superheated steam. In British Specification No. 2209383 a continuous drying arrangement is described where the inlet and outlet from the enclosure are each defined by a pair of cooperating rollers having flexibly resilient engaging outer surfaces. A conveyor, carrying the articles to be dried, passes through the nip of each pair of rollers and the resilient outer surfaces of the rollers press tightly against the conveyor and articles as they pass through, thus providing a substantially gas-tight seal to prevent the escape of superheated steam from the enclosure, or entry of air into the enclosure.

In the arrangement described in the earlier specification the articles are garments suspended from a conveyor and it is quite feasible for garments, at least of some kinds, to pass between flexible rollers in this manner. However, there are many other materials for which this form of barrier is unsuitable, either because the flexible rollers cannot provide an adequate gas-tight seal in view of the nature and shape of the materials, or because the materials might be damaged or altered by the pressure of the rollers. For example it is extremely difficult to arrange for bricks and similar solid articles to pass between resilient rollers in a substantially gas-tight manner, and comparatively delicate products, such as ceramics, are also likely to be damaged by the pressure of the rollers.

British Patent Specification No. 798291 describes a humpback drying apparatus for the continuous drying of charged accumulator plates. A water seal is provided at the lower end of the inlet duct into the drying chamber, and the articles to be dried must pass through the water seal. Such arrangement is obviously unsuitable for the drying of articles or materials which might be damaged or otherwise adversely affected by immersion in water. No seal of any kind is provided at the outlet end of the apparatus, and steam from the drying tunnel simply escapes to the atmosphere.

"Mechanical World and Engineering Record", October 1954, page 449, describes an apparatus for storing articles by conveying them continuously through a conventional hump-backed drying oven. The lower parts of the oven are open to the atmosphere, and the lower density of the heated air within the oven is said to form a "natural heat seal" which inhibits the escape of heated air from the oven. In practice there will be some downward escape of heated air, and hoods usually have to be provided, as shown, to lead the escaping air upwards away from the apparatus. This escape of heated air can only be controlled by carefully balancing the flow of heated air into the oven, and the discharge of heated air and other gases from the oven. If the discharge flow exceeds the inward flow cold ambient air will enter the oven and change the internal recirculating air temperature, to the detriment of the process.

SUMMARY OF THE INVENTION

The present invention sets out to provide a method and apparatus for continuous drying of moist materials in superheated steam whereby the materials to be dried pass into and/or out of the enclosure through a non-mechanical barrier which allows the free passage of the materials without any significant restraint, while at the same time providing effectively a substantially gas-tight seal to prevent the escape of superheated steam from the drying enclosure or the entry of air into the enclosure.

According to the invention there is provided apparatus for continuous drying of moist materials in superheated steam comprising a drying enclosure, means for generating superheated steam at least partly to dry moist materials in said enclosure, an inlet duct and an outlet duct, and a vent duct having an outlet at an appropriate level, each duct communicating with the enclosure, and means for conveying material along said inlet and outlet ducts to and from the enclosure respectively, at least said outlet duct extending downwardly from its communication with the enclosure and having an open end through which, in use, said material is conveyed out of the duct whereby, in use, steam tending to pass downwardly along said outlet duct and external air or other gas tending to pass upwardly along the outlet duct meet to form within the duct a temperature and density differential stratification layer, located at a level substantially at the level of the outlet from said vent duct, between said steam and air or other gas, which layer inhibits the escape of steam from the enclosure and the entry of said external air or other gas into the enclosure, by flow along the outlet duct, while permitting the conveyance of material along the duct and through said stratification layer, and the discharge from the enclosure through the outlet from said vent duct of a portion of the generated steam.

Said inlet duct may also extend downwardly from its communication with the enclosure and have an open end through which, in use, said material is conveyed into the duct whereby, in use, a temperature and density differential stratification layer is also formed within the inlet duct between said steam and air or other gas, which layer inhibits the escape of steam from the enclosure and the entry of external air or other gas into the enclosure, by flow along the inlet duct, while permitting the conveyance of material along the inlet duct and through said stratification layer.

The inlet and outlet ducts may be separate, or there may be provided a single common duct which constitutes both said inlet duct and said outlet duct.

Alternatively said inlet duct may, in use, be such that it is substantially filled with material being conveyed along said duct, whereby said material itself forms a barrier to the escape of steam from the enclosure along the inlet duct.

Said means for generating superheated steam may include a heat source and a fan device for circulating gas within the enclosure between the heat source and material to be dried in the enclosure, whereby said superheated steam is generated, at least in part, from moisture in said material.

Alternatively or additionally the means for generating superheated steam may include external steam generating means separate from the enclosure, and conduit means for delivering externally generated steam to the enclosure.

In any of the above arrangements said means for conveying material along at least one of said inlet and outlet ducts may comprise a conveyor structure which is bodily movable along the duct and on which said material is supported. For example, the conveyor structure may comprise a stretch of an endless band conveyor.

Preferably there is provided in the enclosure conveying means to transport material through the enclosure from the inlet duct to the outlet duct. This conveying means may be heated so as to heat and assist in the drying of material supported thereby in the enclosure.

The conveying means for transporting material through the enclosure and said means for conveying material along at least one of said inlet and outlet ducts may comprise portions of a single substantially continuous conveyor.

In any of the above arrangements a portion of the outlet duct above the stratification layer may be thermally insulated and a portion of the outlet duct below the stratification layer may be substantially uninsulated.

In any of the above arrangements the vent duct may include a condenser to condense said portion of superheated steam vented from the enclosure, so as to recover thermal energy therefrom. The condenser may be located adjacent said inlet duct so as to pre-heat, by heat exchange, moist material being conveyed along said inlet duct, and fan means may be provided to circulate heated gas between said condenser and said moist material being conveyed along the inlet duct.

In the case where a stratification layer is formed in the inlet duct said condenser may be located adjacent a portion of the inlet duct below the said stratification layer.

A compressor may be provided in said vent duct to compress said portion of the superheated steam vented from the enclosure through the duct, compressed steam from the compressor being delivered to a condenser located within the enclosure so as to contribute to the heating of moist material in the said enclosure.

In any of the arrangements according to the invention the apparatus may be enclosed within a chamber having means for reducing the pressure in the chamber below atmospheric pressure, thereby to reduce the temperature of the superheated steam. Preferably the enclosure includes automatically, controlled discharge means for discharging excess steam from the enclosure for use elsewhere, said discharge means including a control device, such as a volumetric flow control valve, to restrict the discharge of steam from the enclosure to a quantity insufficient to allow external air or other gas to be drawn into the enclosure, through the aforesaid inlet and outlet ducts, to replace the discharged steam.

In apparatus according to the invention there are preferably provided in the enclosure, and/or in at least one of said inlet and outlet ducts, baffle means to tend to equalise the pressure within and above the upper section of said duct or ducts, to inhibit entrainment of air or steam by the conveyance of material along the duct or ducts, and to confine within the enclosure the turbulence of the superheated steam which would otherwise tend to de-stabilise said stratification layer.

The apparatus may also include a closable outlet from the enclosure whereby the outlet, when opened, allows superheated steam in the enclosure to be displaced by external air or other gas passing into the enclosure through said inlet or outlet ducts.

The invention includes within its scope a method of continuous drying of moist materials in superheated steam in apparatus comprising a drying enclosure, means for generating superheated steam at least partly to dry moist materials inside the enclosure, an inlet duct and an outlet duct, and a vent duct having an outlet at an appropriate level, each duct communicating with the enclosure, and means for conveying material along said inlet and outlet ducts to and from the enclosure respectively, the method comprising disposing said outlet duct to extend downwardly from its communication with the enclosure and controlling the generation of superheated steam within the enclosure so that steam tending to pass downwardly along said outlet duct and external air or other gas tending to pass upwardly along the outlet duct meet to form within the duct a temperature and density differential stratification layer, located at a level substantially at the level of the outlet from said vent duct, between said steam and air or other gas, which layer inhibits the escape of steam from the enclosure and the entry of external air or other gas into the enclosure, by flow along the outlet duct, while permitting the conveyance of material along the duct and through the stratification layer, and the discharge from the enclosure through the outlet from said vent duct of a portion of the generated steam.

The method may also comprise disposing said inlet duct to extend downwardly from its communication with the enclosure so that steam tending to pass downwardly along said inlet duct and external air or other gas tending to pass upwardly along the inlet duct meet to form within the duct a temperature and density differential stratification layer between said steam and air or other gas, which layer inhibits the escape of steam from the enclosure and the entry of external air or other gas into the enclosure, by flow along the inlet duct, while permitting the conveyance of material along the inlet duct and through said stratification layer.

BRIEF DESCRIPTION OF THE DRAWINGS

The following is a more detailed description of embodiments of the invention, by way of example, reference being made to the accompanying drawings in which.

DETAILED DESCRIPTION OF THE INVENTION

Figure 1:
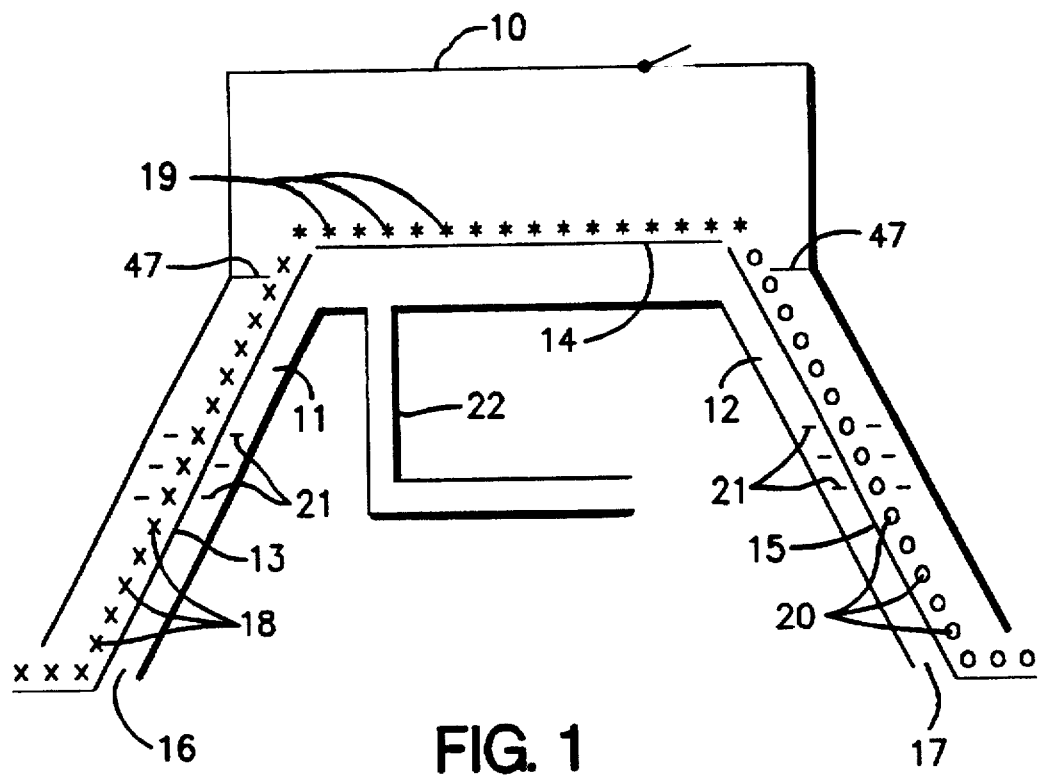
FIG. 1 is a diagrammatic section through a basic form of continuous drying apparatus according to the invention.

Referring to FIG. 1, there is shown diagrammatically a sectional representation of a basic form of apparatus in accordance with the invention for drying moist materials of virtually any kind. The apparatus comprises a drying enclosure 10, an inlet duct 11 leading upwardly to the bottom of the enclosure 10 at one end thereof, and an outlet duct 12 leading downwardly away from the bottom of the opposite end of the enclosure 10.

An inlet conveyor 13 extends upwardly through the inlet duct 11, a drying conveyor 14 extends through the drying enclosure 10, and an outlet conveyor 15 extends downwardly through the outlet duct 12.

The conveyors 13, 14 and 15 may be of any form appropriate to the nature of the materials being conveyed. For example, if the materials to be dried are discrete articles they may be suspended from the conveyors, contained in pockets or other supports on the conveyors or displaced along the duct by elements on the conveyors. In the diagrammatic drawing the ducts 11 and 12, and conveyors 13 and 15 are shown as being steeply inclined but they could instead be inclined at an angle which is sufficiently shallow for the conveyor to provide an inclined surface on which the materials simply rest.

The conveyors 13, 14 and 15 may comprise stretches of a single continuous conveyor system, or they may comprise separate conveyors, the arrangement being such that as an article reaches the end of one conveyor it is transferred to the beginning of the following conveyor.

The bottoms of the ducts 11 and 12 are open as indicated at 16 and 17 respectively and there are clearances between the conveyors, and the materials they carry, and the walls of the ducts 11 and 12. The materials may thus pass freely into and out of the enclosure 10 without having to pass through any mechanical barrier. Moist materials 18 on the inlet conveyor 13 are represented by the symbol "x", materials 19 being conveyed within the enclosure 10 on the drying conveyor 14 are indicated by the symbol "*" and dried materials 20 passing downwardly along the outlet conveyor 15 are represented by the symbol "o".

The material 19 passing through the drying enclosure 10 is dried by the passage of superheated steam over the material while it is passing through the enclosure 10. The superheated steam may be generated from an external source and delivered into the enclosure 10 from that source, or it may be generated from the moisture in the material being dried as described, for example, in British Patent Specification No. 2209383 or as will be described in relation to further embodiments of the present invention.

According to the present invention, due to the disposition of the inlet duct 11 and outlet duct 12, superheated steam trying to escape from the enclosure 10 must pass downwardly through the inlet and outlet ducts 11 and 12. However, the superheated steam tending to pass downwardly along one of these ducts will meet external air or other gas passing upwardly along the duct, having entered at the lower open end thereof. Where the superheated steam and external air meet there is formed a substantially horizontal temperature and density differential stratification layer, as indicated diagrammatically at 21, which inhibits the escape of steam from the enclosure 10 and the entry of external air or gas into the enclosure, by flow along either duct, while allowing the conveyance of the material through the stratification layers. Materials to be dried may thus be passed continuously into and out the drying enclosure 10 through what is, in effect, a non-mechanical substantially gas-tight seal which has no effect on the passage of the conveyors or material.

Typically, where the ambient temperature is 25° C. at 70% relative humidity, the stratification layer 20 may comprise a steam/air mixture at a temperature of 100° C. and a density of 1.37 m$^3$/kg. Above the stratification layer may be pure steam at a temperature of 100° C. and a density of 1.67 m$^3$/kg, whereas below the stratification layer there may be air at 100° C. and a density of 1.08 m$^3$/kg.

Lower down each duct the air may have a temperature of 75° C. and a density of 1.00 m$^3$/kg whereas nearer the top of each duct the steam may have a temperature of, say, 125° C. and a density of 1.79 m$^3$/kg.

The substantial difference in density between the air below the stratification layer and the steam above the layer gives rise to stability of the layer and resistance to cross-diffusion of either of the two gases. In practice a thin stable horizontal layer of "cloud" can sometimes be seen in the stratification layer, where the cooling effect of the ambient air lower down the inlet or outlet duct causes minute suspended water droplets to form in the layer.

As will be described in greater detail in relation to subsequent embodiments, a portion of the superheated steam may be discharged from the enclosure 10 through a vent duct 22.

Figure 2:
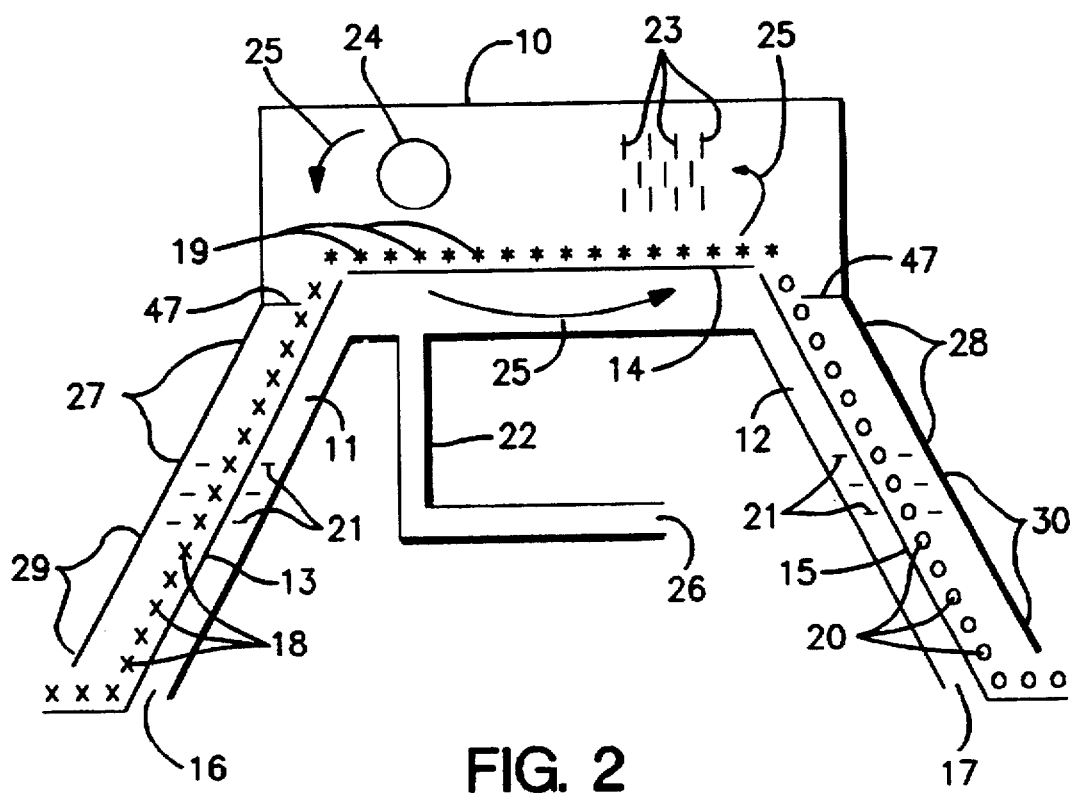
FIGS. 2–7 are similar views of further forms of drying apparatus according to the invention.

In FIGS. 2–7 elements corresponding to elements in the embodiment of FIG. 1 are given the same reference numerals for convenience. In the embodiment of FIG. 2 the superheated steam which effects the drying of the material is wholly or partly generated from the moisture in the material 19 which is, for the time being, on the drying conveyor 14 within the enclosure 10. To this end there is provided within the enclosure 10 a heat source indicated diagrammatically at 23 and a power driven fan 24 which circulates the gas within the enclosure 10 over the material 19 on the drying conveyor 14 and across the heat source 23, as indicated by the arrows 25. The heat source 23 may be of any suitable form, for example as described in the above-mentioned British Patent Specification No. 2209383, and instead of being located within the enclosure 10 itself, the heat source 23 and/or the fan 24 may be located in chambers or ducts communicating with the interior of the enclosure 10.

To start the drying process the air or other gas which initially fills the enclosure 10 is circulated past the heat source 23 and a first portion 19 of the material to be dried which is located within the enclosure 10. In this initial period the conveyors may be stationary. As the air or gas is recirculated it becomes heated and begins to generate steam within the enclosure 10 from the moisture in the material 19. As the heating and recirculation continues the steam generated from the moisture in the material becomes superheated. The vent duct 22 allows a portion of the generated steam to be discharged from the enclosure 10 through an outlet 26 from a vent duct 22.

The conveyors are then started so that the dried material 19 passes on to the outlet conveyor 15 and further moist material passes on to the drying conveyor 14 from the inlet conveyor 13. The process then proceeds continuously, moist material being delivered from a bulk supply and passed up the inlet duct 11 while the dried material passes downwardly along the outlet duct 12 to an appropriate delivery station.

The enclosure 10 and preferably at least the upper sections 27 and 28 of the ducts 11 and 12 are thermally insulated. As in the arrangement of FIG. 1, the substantial gas-tightness of the enclosure 10 and the upper sections 27 and 28 of the ducts is maintained by the horizontal temperature and density differential stratification layers 21 which are formed part-way along the ducts 11 and 12 by the differences in temperature and density between the superheated steam and the ambient air or other gas.

The stratification layers 21 are located within the middle sections of the ducts 11 and 12 by locating the outlet 26 from the vent duct 22 at an appropriate level, for example at the upper ends of lower sections 29 and 30 of the ducts 11 and 12 respectively.

As previously mentioned, in addition to the superheated steam generated from the moisture in the material being dried, part of the superheated steam within the enclosure 10 may also be produced externally, for example by a steam raising boiler (not shown), and injected through a pipe (also not shown) into the enclosure 10. By the use of such an external source of steam displacement of the initial air or other gas from the enclosure 10 may be accelerated.

Breaching of the barrier provided by the stratification layer 21 in the inlet duct 11, by diffusion of external air or other gas through the layer 21, may be inhibited by the downflow within the duct of steam which condenses on and so heats the material 18 being introduced upwardly through the duct. Breaching of the stratification layer 21 in the outlet duct 12 may be inhibited by downflow through the duct of a small volume of steam entrained within and around the materials being conveyed as dried materials 20 down the duct 12, which small volume of steam is sufficient to prevent external air or other gas rising through the open base 17 of the duct 12 and diffusing into the steam within the enclosure 10. To prevent the entrained steam emerging from the open base 17 of the duct 12 the lower section 30 of the duct may be left uninsulated so that its walls remain at or near ambient temperature and thus cause the entrained steam to condense on the inner surfaces of the walls. Sloping drainage runnels (not shown) may be provided in the lower end of the duct 12 to prevent the resulting condensate from dripping onto the dried material.

Figure 3:
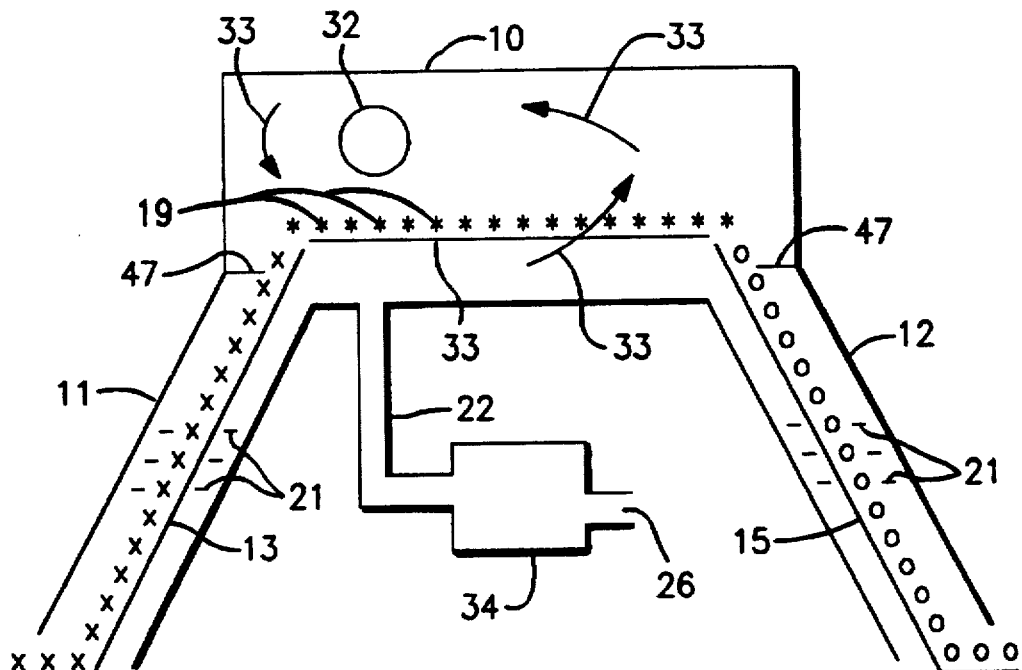

In the embodiment of FIG. 3, the heat source 23 of the apparatus of FIG. 2 is omitted, and the drying conveyor 31 on which the material 19 is conveyed through the enclosure 10 is itself heated. The conveyor 31 may either itself be directly heated, for example by internal electric heating elements, or it may be heated by conduction and/or convection from another heat source (not shown) with which it is in close proximity or contact. In this case the circulation of superheated steam within the enclosure 10, and the initial circulation of the air or gas which initially fills the enclosure, may be effected by convection and/or an optional power driven fan 32 may be provided to effect forced circulation of the superheated steam, as indicated by the arrows 33. In addition to the heated conveyor one or more additional heat sources (not shown) may also be provided within the enclosure 10, or in communication with it. As in the previously described arrangements, superheated steam may also be supplied to the enclosure 10 from an external source.

FIG. 3 also shows an arrangement whereby at least part of the thermal energy of a portion of the steam circulating in the enclosure 10 may be recovered for use. In this case there is provided in the vent duct 22 a condenser 34 to condense out the steam escaping through the vent duct 22. A heat exchanger (not shown) may be associated with the condenser 34 to transfer the recovered thermal energy to another medium so that it may be used for another purpose.

Figure 4:
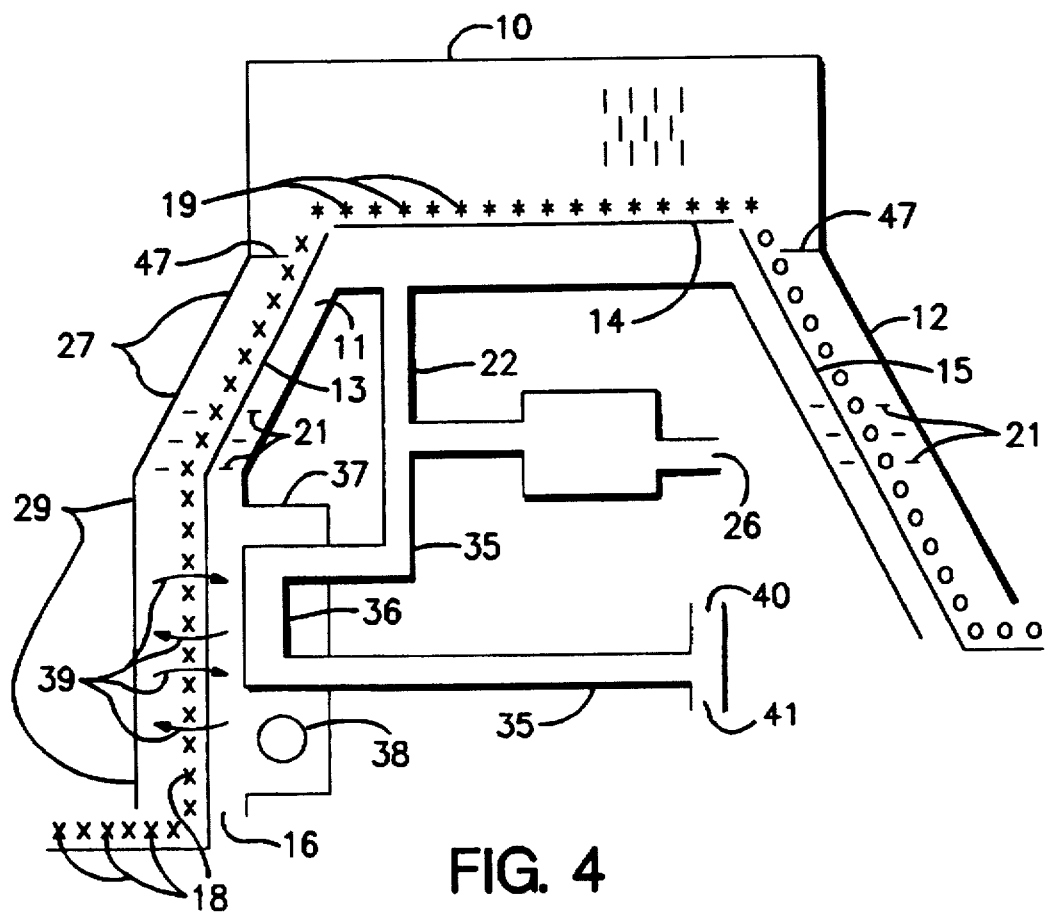

FIG. 4 shows an arrangement which is particularly suitable for use with materials which might be damaged by the condensation of additional moisture on them as they are fed to the drying location, and provides an arrangement whereby such condensation may be avoided.

The arrangement of FIG. 4 may incorporate any of the features described above in relation to FIGS. 1–3 and such features will not therefore be described again in detail. In the embodiment of FIG. 4 there is connected to the vent duct 22 a further duct 35 incorporating an additional condenser 36. The condenser 36 is located within a chamber 37 forming part of the lower portion 29 of the inlet duct 11 so as to provide a heat source within that chamber. In this arrangement the lower portion 29 of the inlet duct 11 may be vertically arranged as shown. A power driven fan 38 is also located within the chamber 37.

Condensation of steam exhausted through the vent duct 22 and passing through the condenser 36 heats the air or other gas within the chamber 37 and the fan 38 recirculates the heated air, preferably horizontally, across the conveyor 13 and moist material 18 as indicated by the arrows 39. The heating of the moist material 18 passing upwardly through the lower portion of the inlet duct 11 prevents condensation of steam on the material 18 as it passes upwardly through the stratification layer 21 and into the upper portion 27 of the duct 11 and the enclosure 10. The preheating of the material 18, as well as preventing condensation on it, also reduces the amount of necessary external heat input into the dryer and the time needed to dry the moist material as it passes through the enclosure 10.

Following the additional condenser 36 the duct 35 leads to upward and downward outlets 40 and 41 respectively. Thus any uncondensed steam flowing out of the condenser 36 rises upwardly through the upward outlet 40 to the level of the outlet 26 from the first condenser 34 while condensate from the condenser 36 is trapped and discharged by gravity through the downward outlet 41.

In a modified version of the arrangement shown in FIG. 4, the further duct 35 may be connected to the outlet 26 of the first condenser 34, instead of to the vent duct 22 as shown. The two condensers 34 and 36 are then connected in series instead of in parallel, so that ,any uncondensed steam and all of the condensate flowing out of the outlet 26 from the first condenser is passed to the condenser 36.

Figure 5:
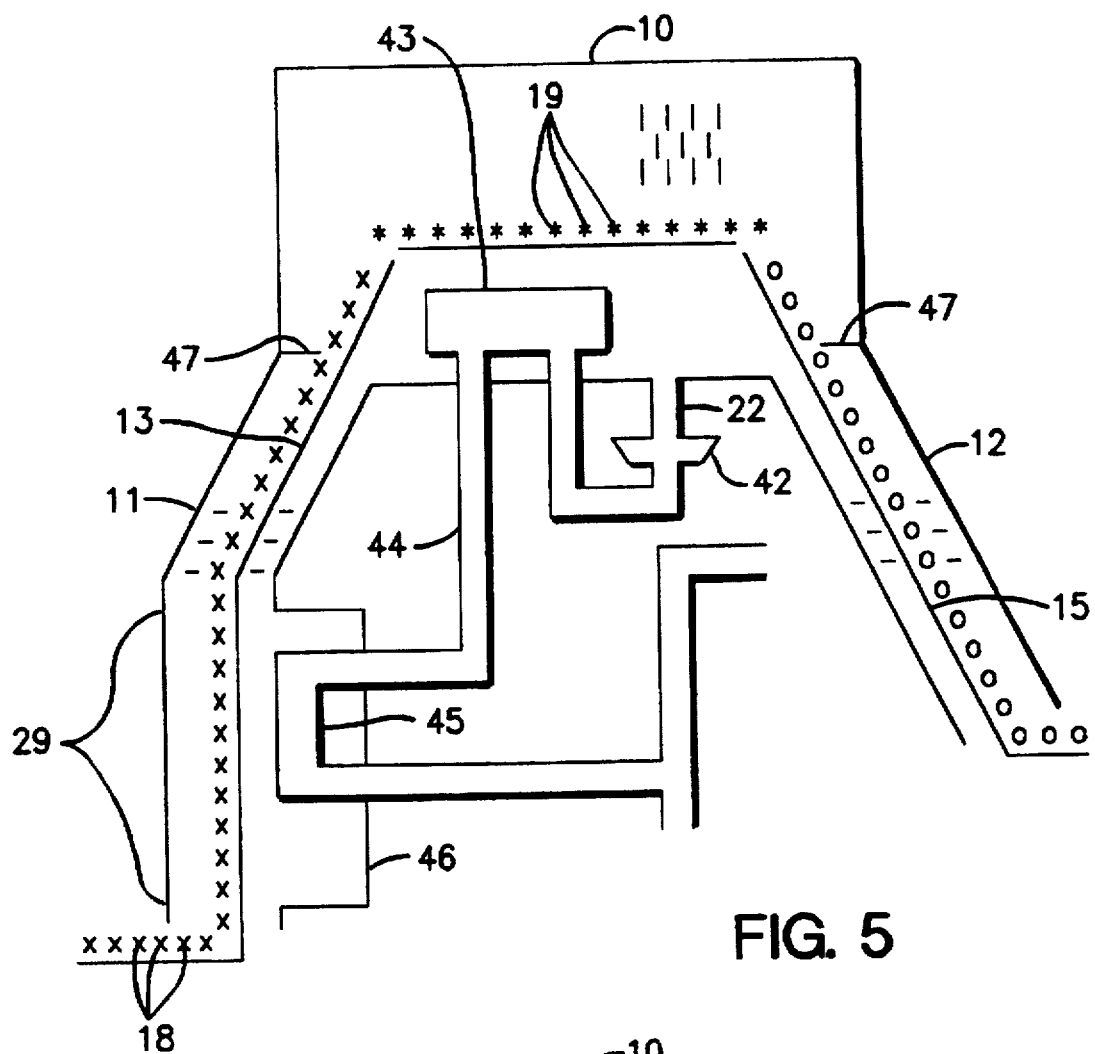

FIG. 5 shows a modified version of the embodiment of FIG. 4 where steam vented through the vent duct 22 is not passed to an external condenser 34 but is delivered to a condenser within the enclosure 10.

In this arrangement steam discharged from the enclosure 10 through the vent duct 22 is compressed by a compressor 42 so as to raise its saturation temperature to above that of the superheated steam in the enclosure 10 to enable at least part of the thermal energy of the steam to be recovered in a condenser 43 which is connected to the compressor 42 and located within the enclosure 10. The condenser 43 then serves as an additional heat source within the enclosure 10 thus contributing to the drying of the material 19 passing through the enclosure. Any steam and condensate discharged from the condenser 43 is delivered through a conduit 44 to a heat exchanger 45 located in a chamber 46 in the lower portion 29 of the inlet duct 11.

The heat exchanger 45 serves to preheat the moist material 18 passing upwardly through the inlet duct 10, as described in relation to the condenser 36 of FIG. 4.

In the arrangement of FIG. 5 it must be ensured that the quantity of steam drawn into the compressor 42 is not sufficient to cause external air or other gas to be drawn upwardly into the enclosure 10 through either of the ducts 11 or 12.

This is achieved automatically if total heat use balances total thermal energy input. In this context total heat use comprises the heat used to generate steam from the moisture, together with that lost in the hot dried material, the condensate and any steam leaving the apparatus as well as that lost through the thermal insulation provided. The total thermal energy input comprises the heat output of the condenser 43, together with that of any other heat source and of any fan within the enclosure 10, the heat exchanger 45 and any fan within the lower portion 29 of the inlet duct 11.

In this embodiment of the invention, if the said total heat use is significantly less than the said total thermal energy input, at least part of the compressed steam output may be piped out of the enclosure 10 to enable it to be used elsewhere as process steam, and automatic control means, for example a volumetric flow control valve, may be employed to restrict such use to ensure that the portion of steam withdrawn is not sufficient to cause external air or gas to be drawn into the enclosure upwardly through the ducts 11 and 12.

Again in this embodiment of the invention, if the said total heat use is more than the said total thermal energy input, one or more externally supplied heat sources may be provided to at least balance the excess, again to prevent external air or gas being drawn into the enclosure.

An arrangement comprising the compressor 42 and condenser 43, as shown in FIG. 5, may also be employed in any of the other described embodiments of the invention, and such embodiments may also include an external condenser such as is indicated at 34 in FIG. 3.

Figure 6:
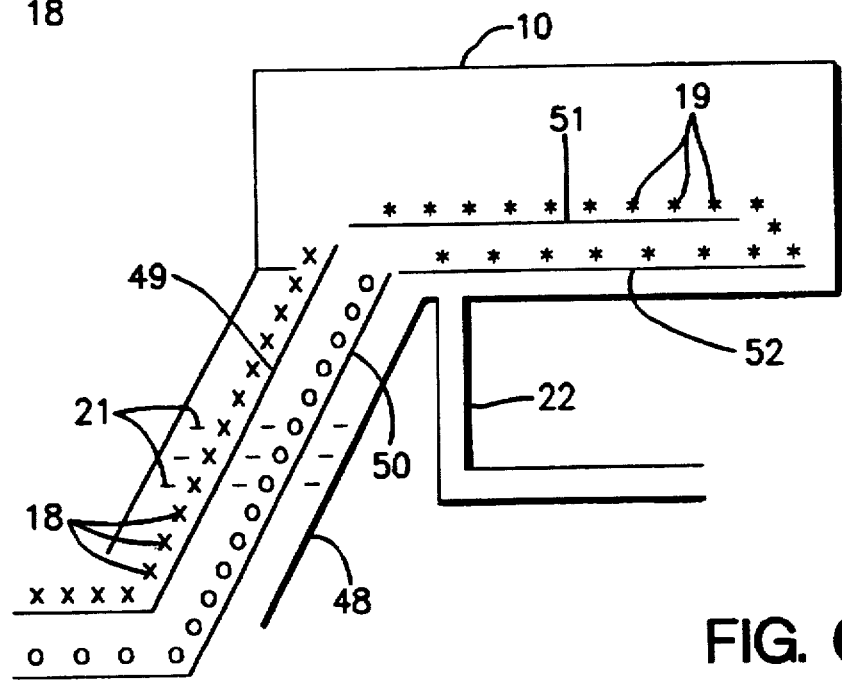

In all of the above-described arrangements separate inlet and outlet ducts 11 and 12 are provided. FIG. 6 shows diagrammatically an alternative arrangement where a single common duct serves as both an inlet and outlet duct.

Referring to FIG. 6, the common duct 48 leads upwardly at an angle to one end of the enclosure 10 and contains an upward moving inlet conveyor 49 spaced from a downwardly moving outlet conveyor 50.

At the upper end of the inlet conveyor 49 the moist material 18 is transferred to one stretch 51 of a drying conveyor extending through the enclosure 10. At the end of the stretch 51 of the conveyor the material passes on to a return stretch 52 of the drying conveyor from where it is delivered to the upper end of the downwardly moving outlet conveyor 50. As in the previously described arrangements the escape of steam from the enclosure 10 is prevented by the formation of a stratification layer 21 in the common duct 48.

In FIG. 6 the material 19 being dried within the enclosure 10 is shown as falling downwardly from the end of the upper stretch 51 of the drying conveyor on to the lower return stretch 52. However this is merely for the purposes of illustration, and it will be appreciated that the stretches 51 and 52 may be continuous and may lie in the same plane. For example, the drying conveyor may be of generally U-shaped configuration. Similarly, although the inlet and outlet conveyors 49,50 are represented as being one above the other, they could equally well be disposed side-by-side within the common duct 48.

FIG. 6 shows a simple vent duct 22 corresponding to that of FIG. 2, but it will be appreciated that any of the previously described condenser arrangements may also be provided. Indeed, any of the optional features described in relation to the embodiments of FIGS. 1–5 may also be applied to the embodiment of FIG. 6.

Figure 7:
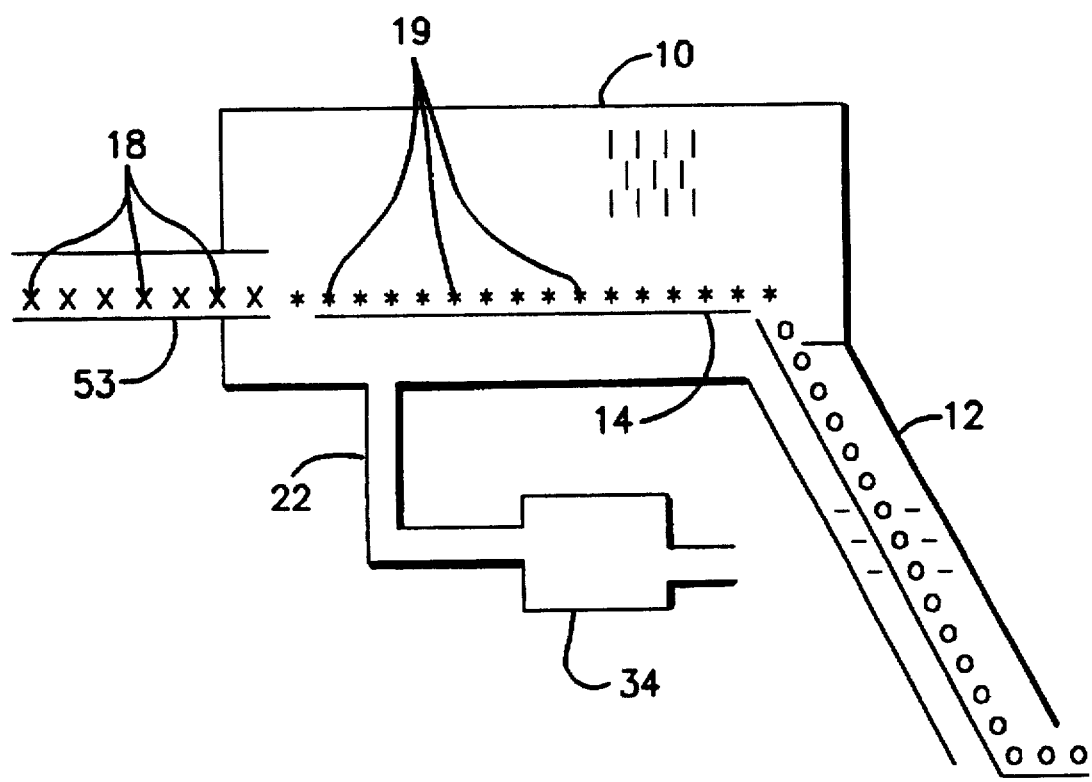

If the moist material to be dried is in the form of a slurry, or other flowable material, it may be delivered to the drying enclosure 10 through a pipe, and in this case the inlet duct 11 of the previously described arrangements may be dispensed with. Such an arrangement is shown in FIG. 7. This shows a horizontal pipe 53 communicating directly with the enclosure 10 so that moist material 18 delivered under pressure along the pipe 53 is passed directly on to the drying conveyor 14 within the enclosure 10. The discharge from the pipe 53 is preferably arranged so that the material is spread in the form of a shallow layer across the width of the conveyor 14. Other features of the enclosure 10 and of the outlet duct 12 and outlet conveyor 15 may be in accordance with any of the previously described embodiments.

Since the inlet pipe 53 is completely filled with the slurry, it is effectively gas-tight so that escape of steam from the enclosure 10 through the pipe 53 is not possible.

The pipe 53 may pass through an additional condenser (not shown) located either inside or outside the enclosure 10, the condenser pre-heating the slurry so that no condensation of moisture on the slurry can occur as it is passed into the enclosure 10, thus reducing both the external thermal energy input and the time required for drying. The condenser for pre-heating the slurry may correspond to the condenser 36 of the FIG. 4 arrangement and may be connected in similar fashion.

In any of the described arrangements, baffles and/or deflectors, as indicated for example at 47, may be provided within the enclosure 10 or within at least one of the inlet and outlet ducts 11 and 12, in order to equalise the pressure within the enclosure 10 above and within all of the upper sections of the ducts and so assist in preventing external air or gas being drawn upwards into either of the ducts. Such baffles and/or deflectors may also prevent turbulence of the superheated steam within the enclosure 10, or draughts in the external air or other gas, causing destabilisation of the stratification layer 21 within the middle sections of the ducts.

Any of the forms of apparatus according to the invention may include, preferably located in the top of the enclosure 10, an outlet (indicated at 60 in FIG. 1) which, when opened, will allow any superheated steam contained within the enclosure 10 to escape through the outlet, external air or other gas then rising by convection through the ducts 11 and 12 to replace the escaping steam, so that subsequent safe access to the enclosure 10 may be facilitated.

In any of the above described arrangements, the internal constructional features of the enclosure 10, such as the drying conveyor 14, heat source 23 and fan 24, are preferably mounted on the base of the enclosure 10 and are accessible through access panels in the base. This enables the thermally insulated walls and top of the enclosure 10 to be made of lightweight materials and constructed in the form of a lid resting in gas-tight sealing manner on the perimeter of the base of the enclosure 10. Hydraulic or other lifting apparatus may be provided to enable the lid to be lifted clear of the base to a height sufficient to provide easy access to all the internal constructional features of the enclosure.

Any apparatus according to the invention may also include the provision of ionisation apparatus which can be applied to any or all of the steam within the enclosure 10, to the stratification layers 21, or to the external air or other gas within the lower sections of the inlet and outlet ducts. Such ionisation may increase the tendency of the steam and external air or other gas to remain separate at the level of the stratification layer 21.

The conveyors conveying material through the inlet and outlet ducts and the enclosure 10 may comprise one or more endless band conveyors. In each case the return stretch of the endless band conveyor preferably passes through a thermally insulated tunnel so as to reduce heat losses from the structure.

In an alternative construction the conveyors may comprise passive or mechanically rotated rollers over which the material to be dried may be drawn or conveyed through the apparatus. Such an arrangement is particularly suitable where the materials are in sheet or flattened form. Such rollers may be heated so as to assist in the preheating and/or drying of the materials.

In another embodiment any drying conveyor 14 for transporting materials through the enclosure 10 may comprise a rotatable sloping cylinder, which may have a perforated shell, so arranged that as the cylinder is rotated material within the cylinder is tumbled along the length of the cylinder. Alternatively, any conveyor may comprise a sloping vibrating platform or channel. In either case any conveyor may be heated so as to comprise a heated conveyor 31 described in the embodiment of FIG. 3.

Any inlet conveyor 13 may also be heated so as to pre-heat the moist material carried by it.

In any apparatus according to the invention the dried material being conveyed down the outlet duct 12 may where advantageous be cooled when passing through the lower section 30 of the outlet duct, or subsequently thereto. Cooling may be effected by heat exchange with a cooling medium which may then be arranged to transfer its heat to moist material being delivered to the drying enclosure.

In any of the described arrangements the apparatus may be contained within a vacuum chamber, in order to reduce the pressure and therefore the temperature at which steam is produced from the moist material. This enables material to be dried which cannot tolerate the temperature of superheated steam at atmospheric pressure, since the reduced pressure within the vacuum chamber may reduce the temperature of the superheated steam to below 100° C. In such an apparatus, after reducing the pressure within the vacuum chamber to below atmospheric pressure by means of a vacuum pump, the low pressure may be maintained by causing successive portions of steam vented from the enclosure to be directly condensed into water which is thereby drawn upwards into and subsequently fills each of at least two additional small vacuum chambers with said water. Thus, as a successive portion of steam vented from the enclosure 10 is released into a preceding small vacuum chamber, the water previously drawn upwards into said preceding vacuum chamber is released downwards and in its downwards descent may be used to provide motive power. Any small volume of incondensible gas remaining in any of the small vacuum chambers may be removed by means of a further small vacuum pump.

In any of the arrangements according to the invention successive batches of different materials may be dried separately in the drying enclosure by allowing each batch completely to pass out of the enclosure before introducing another batch of a different material into the steam atmosphere left in the enclosure by the drying of the preceding batch.

I claim:

1. Apparatus for continuous drying of moist materials in superheated steam comprising a drying enclosure, means for generating superheated steam at least partly to dry moist materials in said enclosure, an inlet duct and an outlet duct, communicating with the enclosure, means for conveying material along said ducts to and from the enclosure respectively, and through said enclosure, at least said outlet duct extending downwardly from its communication with the enclosure and having an open end through which, in use, said material is conveyed out of the outlet duct, characterized in that the apparatus has a vent duct communicating with the enclosure and having an outlet at a level below the enclosure and above the open end of the outlet duct permitting the discharge from the enclosure of a portion of the superheated steam, whereby, in use, steam tending to pass downwardly along said outlet duct and external air or other gas tending to pass upwardly along the outlet duct can meet to form within the outlet duct a temperature and density differential stratification layer between said steam and air or other gas, which layer is located substantially at the level of the outlet of said vent duct and inhibits the escape of steam from the enclosure and the entry of said external air or other gas into the enclosure, by flow along the outlet duct, while permitting the conveyance of material along the outlet duct and through said stratification layer.

2. Apparatus according to claim 1, wherein said inlet duct also extends downwardly from its communication with the enclosure and has an open end through which, in use, said material is conveyed into the inlet duct whereby, in use, a temperature and density differential stratification layer is also formed within the inlet duct between said steam and air or other gas, which layer inhibits the escape of steam from the enclosure and the entry of external air or other gas into the enclosure, by flow along the inlet duct, while permitting the conveyance of material along the inlet duct and through said stratification layer.

3. Apparatus according to claim 2, wherein there is provided a single common duct which constitutes both said inlet duct and said outlet duct.

4. Apparatus according to claim 1, wherein said inlet duct is, in use, substantially filled with material being conveyed along said inlet duct, whereby said material itself forms a barrier to the escape of steam from the enclosure along the inlet duct.

5. Apparatus according to claim 1, wherein said means for generating superheated steam include a heat source and a fan device for circulating gas within the enclosure between the heat source and material to be dried in the enclosure, whereby said superheated steam is generated, at least in part, from moisture in said material.

6. Apparatus according to claim 1, wherein said means for generating superheated steam include external steam generating means separate from the enclosure, and conduit means for delivering externally generated steam to the enclosure.

7. Apparatus according to claim 1, wherein the vent duct includes a condenser to condense said portion of superheated steam vented from the enclosure, so as to recover thermal energy therefrom.

8. Apparatus according to claim 7, wherein said condenser is located adjacent said inlet duct so as to preheat, by heat exchange, moist material being conveyed along said inlet duct.

9. Apparatus according to claim 7, wherein said vent duct includes at least two condensers in series, one of said condensers being located adjacent said inlet duct.

10. Apparatus according to claim 8, wherein fan means are provided to circulate heated gas between said condenser and said moist material being conveyed along the inlet duct.

11. Apparatus according to claim 1, wherein a compressor is provided in said vent duct to compress said portion of the superheated steam vented from the enclosure through the vent duct, and wherein compressed steam from the compressor is delivered to a condenser located within the enclosure so as to contribute to the heating of moist material in the said enclosure.

12. Apparatus according to claim 1, wherein said apparatus is enclosed within a chamber having means for reducing the pressure in the chamber below atmospheric pressure, thereby to reduce the temperature of the superheated steam.

13. Apparatus according to claim 1, wherein the enclosure includes automatically controlled discharge means for discharging excess steam from the enclosure for use elsewhere, said discharge means including a control device to restrict the discharge of steam from the enclosure to a quantity insufficient to allow external air or other gas to be drawn into the enclosure, through the aforesaid inlet and outlet ducts, to replace the discharged steam.

14. Apparatus according to claim 1, wherein there is provided in at least one of said enclosure, inlet duct and outlet duct, at least one of baffle means and deflector means to tend to equalize the pressure within and above the upper section of said inlet or outlet duct, to inhibit entrainment of air or stream by the conveyance of material along the inlet or outlet duct, and to confine within the enclosure the turbulence of the superheated steam which would otherwise tend to destabilize said stratification layer.

* * * * *